United States Patent [19]

Kamada et al.

[11] Patent Number: 5,517,647
[45] Date of Patent: May 14, 1996

[54] COMMUNICATION CONTROL SYSTEM AND INFORMATION PROCESSING SYSTEM

[75] Inventors: Seiji Kamada, Hitachi; Kenji Kawakita, Yokohama, both of Japan

[73] Assignee: Hitachi, Ltd., Tokyo, Japan

[21] Appl. No.: 916,720

[22] Filed: Jul. 22, 1992

[30]     Foreign Application Priority Data

Jul. 22, 1991  [JP]  Japan ..................... 3-181021

[51] Int. Cl.⁶ .................................................. G06F 13/36
[52] U.S. Cl. ..................... 355/728; 364/232.8; 364/240
[58] Field of Search ................. 341/3, 60; 395/200, 395/325, 725, 728

[56]           References Cited

U.S. PATENT DOCUMENTS

| | | | |
|---|---|---|---|
| 4,546,429 | 10/1985 | Chan et al. | 364/200 |
| 4,907,225 | 3/1990 | Gulick et al. | 370/94.1 |
| 5,067,104 | 11/1991 | Krishnakumar et al. | 395/375 |
| 5,148,545 | 9/1992 | Herbst et al. | 395/725 |
| 5,155,857 | 10/1992 | Kunisaki et al. | 395/800 |
| 5,165,022 | 11/1992 | Ernard et al. | 395/275 |
| 5,202,964 | 4/1993 | Crouch | 395/275 |
| 5,226,173 | 7/1993 | Sasaki et al. | 395/800 |
| 5,272,767 | 12/1993 | Asmuth et al. | 382/41 |

*Primary Examiner*—Jack B. Harvey
*Assistant Examiner*—Paul R. Myers
*Attorney, Agent, or Firm*—Antonelli, Terry, Stout & Kraus

[57]                ABSTRACT

Information of a plurality of operation modes is stored in memory. Information of temporary protocols and true protocols is associated with event numbers and processing state numbers, then stored in a status transition table circuit. When an event number and a processing state number are set in an input register, a CPU selects a temporary protocol according to the event number and processing state number. Then, the CPU retrieves an operation mode associated with the temporary protocol from memory, selects a true protocol according to the retrieved operation mode, then executes information processing according to the true protocol.

9 Claims, 13 Drawing Sheets

FIG. 3

| EVENT NUMBER \ CURRENT STATE NUMBER | 0 | ---- | 9 | 10 | 11 | ---- | 31 |
|---|---|---|---|---|---|---|---|
| 0 | | | | | | | |
| ⋮ | | | | | | | |
| 19 | | ----- | 70 / 2 | 70 / 2 | 70 / 2 | --- | |
| 20 | | ----- | 100 / 10 | 200 / 10 | 100 / 10 | --- | |
| 21 | | ----- | 140 / 12 | 140 / 12 | 140 / 12 | --- | |
| ⋮ | | | | | | | |
| 127 | | | | | | | |

UPPER : PROCESSING NUMBER
LOWER : NEXT STATE NUMBER

FIG. 6

| TABLE ADDRESS | | PROCESSING NUMBER |
|---|---|---|
| 0<br>ı<br>207 | COMMON<br>PROCESSING<br>NUMBER | 0<br>ı<br>207 |
| 208 ~ 223 | | 208 ~ 223 IN α MODE |
| 224 ~ 239 | | 208 ~ 223 IN β MODE |
| 240 ~ 255 | | 208 ~ 223 IN γ MODE |

FIG. 9

| EVENT NUMBER \ CURRENT STATE NUMBER | 0 | ---- | 10 | 11 | 12 | 13 | 14 | 15 | ---- | 31 |
|---|---|---|---|---|---|---|---|---|---|---|
| 0 | | | | | | | | | | |
| ---- | | | | | | | | | | |
| 20 | | | α▨ | ▨ | ▨ | | | | | |
| ---- | | | ▨ | ▨ | ▨ | | | | | |
| 24 | | | ▨ | ▨ | β▨ | | | | | |
| 25 | | | | | | | γ▨ | ▨ | | |
| ---- | | | | | | | ▨ | ▨ | | |
| 29 | | | | | | | ▨ | ▨ | | |
| ---- | | | | | | | | | | |
| 127 | | | | | | | | | | | ns
COMMUNICATION CONTROL SYSTEM AND INFORMATION PROCESSING SYSTEM

BACKGROUND OF THE INVENTION

1. Field of the Invention

The present invention relates to a communication control system and an information processing system, or more particularly, to a communication control system and information processing system based on table retrieval for retrieving a status transition table specifying protocols and information processing procedures.

2. Description of the Related Art

In a communication control system, complex status transition has been executed to follow a protocol based on a recommendation standardized as an international standard in the past. A popular method of executing status transition at a high speed has been described, for example, in Japanese Patent Laid-Open No. 64-65653. The protocol is proceeded as follows:

(a) frames are received from a remote station, (b) the frames are classified, and event numbers are created according to the contents, (c) status transition is executed according to an event number and a current state number, then a processing number to be executed next and a next state number to which control passes are retrieved, then (d) processing is executed according to a protocol associated with the calculated processing number.

In the above protocol, status transition is carried out as described below. That is to say, when a status transition table is retrieved, an address made up of an event number and a current state number (accessed at the start of table retrieval) is used to access the status transition table. Then, a next state number and processing number specified by this access are extracted from the status transition table. The next state number is used as a current state number for the next status transition. The processing number is used as an address of a corresponding processing program. By executing this process, a specific processing number and next state number are extracted from the status transition table according to an event number and a current state number.

However, according to the foregoing prior art, when an event number and a current state number are used as a set of input information, the set of input information yields only one processing number. Therefore, a set of input information cannot enable communication in association with multiple operation modes. This means that when a specific processing number is extracted according to an event number and a current state number, only one processing number is selected despite differences of operation modes.

SUMMARY OF THE INVENTION

The object of the present invention is to provide a communication control system and an information processing system capable of executing processing in association with multiple operation modes, and to provide a microcomputer including the communication control system or information processing system.

To achieve the foregoing object, the present invention provides a communication control system as a first system that comprises an event number setting means for setting an event number fetched from input communication information, a processing state number setting means for setting a designated processing state number every time an event number is set, a sub-protocol storage means for storing information of temporary protocols associated with event numbers and processing state numbers, an operation mode setting means for setting multiple operation modes in association with the temporary protocols, a sub-protocol selecting means for retrieving information of a designated protocol from the sub-protocol storage means according to an event number the set by event number setting means and a processing set by state number the processing state number setting means and, an operation mode selecting means for selecting a designated operation mode according to temporary protocol information provided by the sub-protocol selecting means. The communication control system of the first system further comprises main protocol storage means for storing information of true protocols associated with operation modes, a main protocol selecting means for retrieving information of a true protocol from the main protocol storage means according to an operation mode selected by the operation mode selecting means, an information processing means for executing information processing according to a true protocol provided by the main protocol selecting means, and a processing state number designating means for designating a next processing state number for the processing state number setting means with running of the information processing means.

The second system is a communication control system comprising an event number setting means for setting an event number fetched from input communication information, a processing state number setting means for setting a designated processing state number every time an event number is set, an operation mode storage means for storing multiple operation modes in association with event numbers and processing state numbers, an operation mode selecting means for retrieving a designated operation mode from the designated event number setting means according to an event number set by the event number setting means and a processing state number set by the processing state number setting means, an auxiliary event number creating means for creating an auxiliary event number associated with an operation mode according to an event number set by the event number setting means and, an auxiliary processing state number creating means for creating an auxiliary processing state number associated with an operation mode according to a processing state number set by the processing state number setting means control system of the second system further comprises a protocol storage means for storing information of true protocols associated with auxiliary event numbers and auxiliary processing state numbers, a protocol selecting means for retrieving information of a true protocol from the protocol storage means according to a created auxiliary event number and auxiliary processing state number, an information processing means for executing information processing according to a true protocol provided by the protocol selecting means, and a processing state number designating means for designating a next processing state number for the processing state number setting means with running of the information processing means.

The third system is a communication control system comprising an event number setting means for setting an event number fetched from input communication information, a processing state number setting means for setting a designated processing state number every time an event number is set, an operation mode setting means for setting a designated operation mode every time an event number is set, an event number checking means for determining whether an event number set by the event number setting means falls within a setting range, an auxiliary event number creating means for creating an auxiliary event number associated with an operation mode set by the operation mode setting means according to an event number when the event number checking means determines that the event number set by the event number setting means falls within a setting range, a processing state number checking means for determining whether a processing state number set by the processing state number setting means falls within a setting range, and an auxiliary processing state number creating means for creating an auxiliary processing state number associated with an operation mode set by the operation mode setting means according to a processing state number when the processing state number checking means determines that the processing number set by the processing state number setting means falls within a setting range. The communication control system of the third system further comprises a protocol storage means for storing information of multiple protocols associated with auxiliary event numbers and auxiliary processing state numbers, a protocol selecting means for retrieving information of a designated protocol from the protocol storage means according to an auxiliary event number created by the auxiliary event number creating means and an auxiliary processing state number created by the auxiliary processing number creating means, an information processing means for executing information processing according to a protocol provided by the processing protocol selecting means, and a processing state number designating means for designating a next processing state number for the processing state number setting means with running of the information processing means.

The fourth system is a communication control system comprising an event number setting means for setting an event number fetched from input communication information, a processing state number setting means for setting a designated processing state number every time an event number is set, a protocol storage means for storing information of multiple protocols associated with event numbers and processing numbers, a protocol selecting means for retrieving information of a designated protocol from the protocol storage means according to an event number set by the event number setting means and a processing state number set by the processing state number setting means, an operation mode storage means for storing operation modes in association with protocols, an operation mode selecting means for retrieving a designated operation mode from the operation mode storage means according to a protocol provided by the protocol selecting means and, a processing module storage means for storing operation modules in association with operation modes. The communication control system of the fourth system further comprises a processing module selecting means for retrieving a designated processing module from the processing module storage means according to an operation mode provided by the operation mode selecting means, a processing module executing means for executing a processing module selected by the processing module selecting means, and a processing state number designating means for designating a next processing state number for the processing state number setting means with execution of a processing module.

The fifth system is an information processing system comprising an event type setting means for setting an event type fetched from input information, an information processing state setting means for setting a designated information processing state every time an event type is set, a sub-processing procedure storage means for storing information of temporary information processing procedures associated with event types and processing states, an operation mode setting means for setting multiple operation modes in association with temporary information processing procedures, and a sub-processing procedure selecting means for retrieving information of a designated information processing procedure from the sub-processing procedure storage means according to an event type set by the event type setting means and an information processing state set by the information processing state setting means sets. The information processing system of the fifth system further comprises an operation mode selecting means for selecting a designated operation mode according to a temporary information processing procedure provided by the sub-processing procedure selecting means, a main processing procedure storage means for storing information of true information processing procedures in association with operation modes, a main processing procedure selecting means for retrieving information of a true information processing procedure from the main processing procedure storage means according to an operation mode provided by the operation mode selecting means, an information processing means for executing information processing according to a true information processing procedure provided by the main processing procedure selecting means, an information processing state designating means for designating a next information processing state for the information processing state setting means with running of the information processing means.

The sixth system is an information processing system comprising an event type setting means for setting an event type fetched from input information, an information processing state setting means for setting a designated information processing state every time an event type is set, an operation mode storage means for storing multiple operation modes in association with event types and information processing states, an operation mode selecting means for retrieving a designated operation mode from the operation mode storage means according to an event type set by the event setting means and an information processing state set by the information processing state setting means, an auxiliary event type creating means for creating an auxiliary event type associated with an operation mode according to an event type set by the event type setting means, an auxiliary information processing state creating means for creating an auxiliary information processing state associated with an operation mode according to an information processing state set by the information processing state setting means, a processing procedure storage means for storing true processing procedures in association with event types and auxiliary information states. The information processing system of the sixth system further comprises a processing procedure selecting means for retrieving information of a true information processing procedure from the information processing procedure storage means according to a created auxiliary event type and auxiliary information processing state, an information processing means for executing information processing according to a true information processing procedure provided by the processing procedure selecting means, and an information processing state designating means for designating a next information processing state for the information processing state setting means with running of the information processing means.

The seventh system is an information processing system comprising an event type setting means for setting an event type fetched from input information, an information processing state setting means for setting a designated information processing state every time an event type is set, an operation mode setting means for setting a designated operation mode every time an event type is set, an event type checking means for determining whether an event type set by the event type setting means falls within a setting range, an auxiliary event type creating means for creating an auxiliary event type associated with an operation mode set by the operation mode setting means according to an event type when the event type checking means determines that the event type set by the event type setting means falls within a setting range, an information processing state checking means for determining whether an information processing state set by the information processing state setting means falls within a setting range, an auxiliary information processing state creating means for creating an auxiliary information processing state associated with an operation mode set by the operation mode setting means according to an information processing state when the information processing state checking means determines that the information processing state set by the information state setting means falls within a setting range, and a processing procedure storage means for storing information of multiple information processing procedures associated with auxiliary event types and auxiliary information processing states. The information processing system of the seventh system further comprises a processing procedure selecting means for retrieving information of a designated information processing procedure from the processing procedure storage means according to an auxiliary event type created by the auxiliary event type creating means and an auxiliary information processing state created by the auxiliary information processing state creating means creates, an information processing means for executing information processing according to an information processing procedure provided by the information processing procedure selecting means, and an information processing state designating means for designating a next information processing sate for the information processing state setting means with with running of the information processing means.

The eighth system is an information processing system comprising an event type setting means for setting an event type fetched from input information, an information processing state setting means for setting a designated information processing state every time an event type is set, a processing procedure storage means for storing information of multiple information processing procedures associated with event types and information processing states, a processing procedure selecting means for retrieving information of a designated information processing procedure from the processing procedure storage means according to an event type set by the event type setting means and an information processing state set by the information processing state setting means, an operation mode storage means for storing operation modes in association with information processing procedures and, an operation mode selecting means for retrieving a designated operation mode from the operation mode storage means according to an information processing procedure provided by the information processing procedure selecting means. The information processing system of the eighth system further comprises a processing module storage means for storing processing modules in association with operation modes, a processing module selecting means for retrieving a designated processing module from the processing module storage means according to an operation mode provided by the operation mode selecting means, a processing module executing means for executing a processing module provided by the processing module selecting means provides, and an information processing state designating means for designating a next information processing state for the information processing state setting means with execution of a processing module.

The ninth system is a microcomputer having any of the first to eighth systems as a main component.

In the first embodiment of the invention, first, a temporary protocol is extracted according to an event number and a current state number. Then, an operation mode is selected in association with the temporary protocol, and a true protocol is selected according to the operation mode. Next, information processing is executed according to the true protocol. With the execution, a next processing state number is designated. Thus, when a temporary protocol is extracted, a specific protocol can be selected from true protocols according to an operation mode.

The second embodiment of the invention selects a specific operation mode according to an event number and a current state number. Then, a protocol associated with the operation mode is extracted from true protocols. Information processing is executed according to the extracted protocol. With the execution, a next processing state number is designated. More specifically, a designated operation mode is selected from operation modes according to the event number and current state number. Then, a protocol is selected in association with the selected operation mode. Thus, when an event number and a current state number are set to specify an operation mode, a protocol associated with the operation mode can be extracted from multiple protocols.

The third embodiment of the invention sets multiple protocols in association with auxiliary event numbers and auxiliary processing state numbers. Then, when an event number and a current state number fall within the setting ranges, an auxiliary event number and an auxiliary state processing number are created according to an operation mode. A protocol associated with the auxiliary event number and auxiliary state number is extracted from multiple protocols. Then, information processing is executed according to the extracted protocol. With the execution, a next processing state number is designated. More specifically, when an event number and a processing slate number falling within the setting ranges are set, the numbers are converted into an auxiliary event number and an auxiliary processing state number. Thus, an operation mode is selected from operation modes according to the auxiliary event number and auxiliary processing state number. Eventually, communication is executed according to the operation mode.

In the fourth embodiment of the invention, a designated protocol is selected according to an event number and a processing state number, then an operation mode is selected from operation modes according to the selected protocol. Then, a processing module associated with the operation mode is extracted from processing modules. Then, the extracted processing module is executed. With the execution, a next processing state number is designated. Specifically, multiple processing modules are set in accordance with operation modes, and a processing module associated with any of the operation modes is executed.

DESCRIPTION OF THE DRAWINGS

FIG. 3 is a configuration diagram of a status transition table;

FIG. 6 is an explanatory diagram of a configuration of a ROM;

FIG. 9 is an explanatory diagram of a configuration of a status transition table;

DESCRIPTION OF THE PREFERRED EMBODIMENTS

The embodiment of the present invention will be described in conjunction with the drawings.

Figure 2:
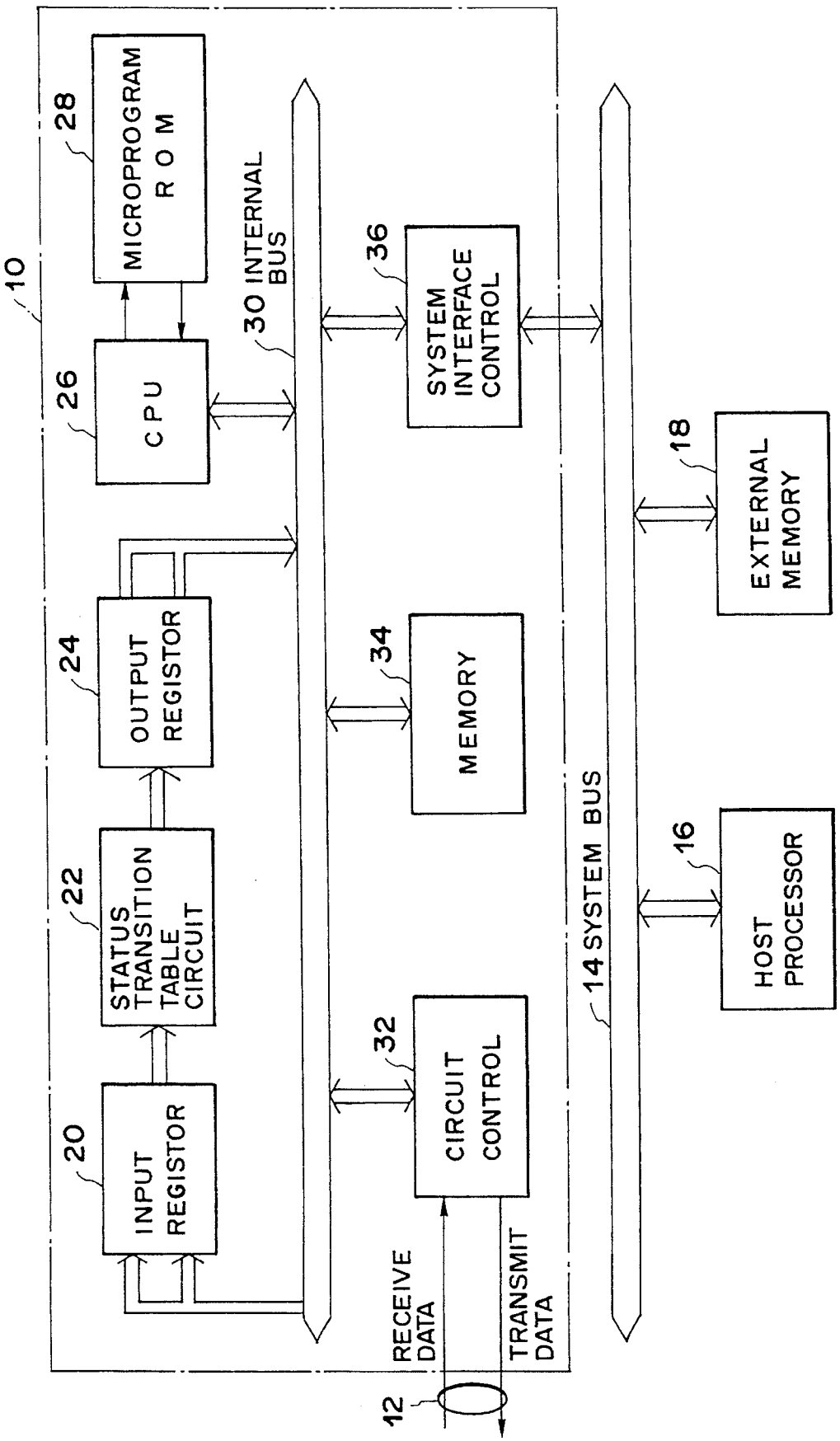
FIG. 2 is a configuration diagram of a system in which the present invention is implemented.

In FIG. 2, a communication control system 10 is formed with a microcomputer, which is connected to another station over a communication line 12 and to a host processor 16 and an external memory 18 over a system bus 14. The communication control system 10 comprises an input register 20, a status transition table circuit 22, an output register 24, a CPU 26, a microprogram ROM 28, an internal bus 30, a circuit control 32, a memory 34, and a system interface control 36. The circuit control 32 is connected to the communication line 12, and the system interface control 36 is connected to the system bus 14.

Various communication information is supplied to the circuit control 32 over the communication line 12. Event numbers of frames included in input communication information are set in the input resistor 20. An operation mode is set in response to an instruction from the host processor 16. Then, various operation modes are stored in the memory 34. The status transition table circuit 22 includes, as shown in FIG. 3, memory areas associated with current state numbers 0 to 31 and event numbers 0 to 127 that are accessed at the start of table retrieval. The memory areas contain processing numbers representing protocols, and next state numbers or numbers to be accessed next. A processing number 200 associated with a temporary protocol and a next state number 10 are stored in a specific area of the memory areas, or a memory area associated with a current state number 10 and an event number 20. Then, when the status transition table circuit 22 is accessed in response to an instruction from the CPU 26, a processing number and next state number fetched from a designated memory area are set in the output resister 24. Programs for executing these operations are stored in the microprogram ROM 28.

Figure 1:
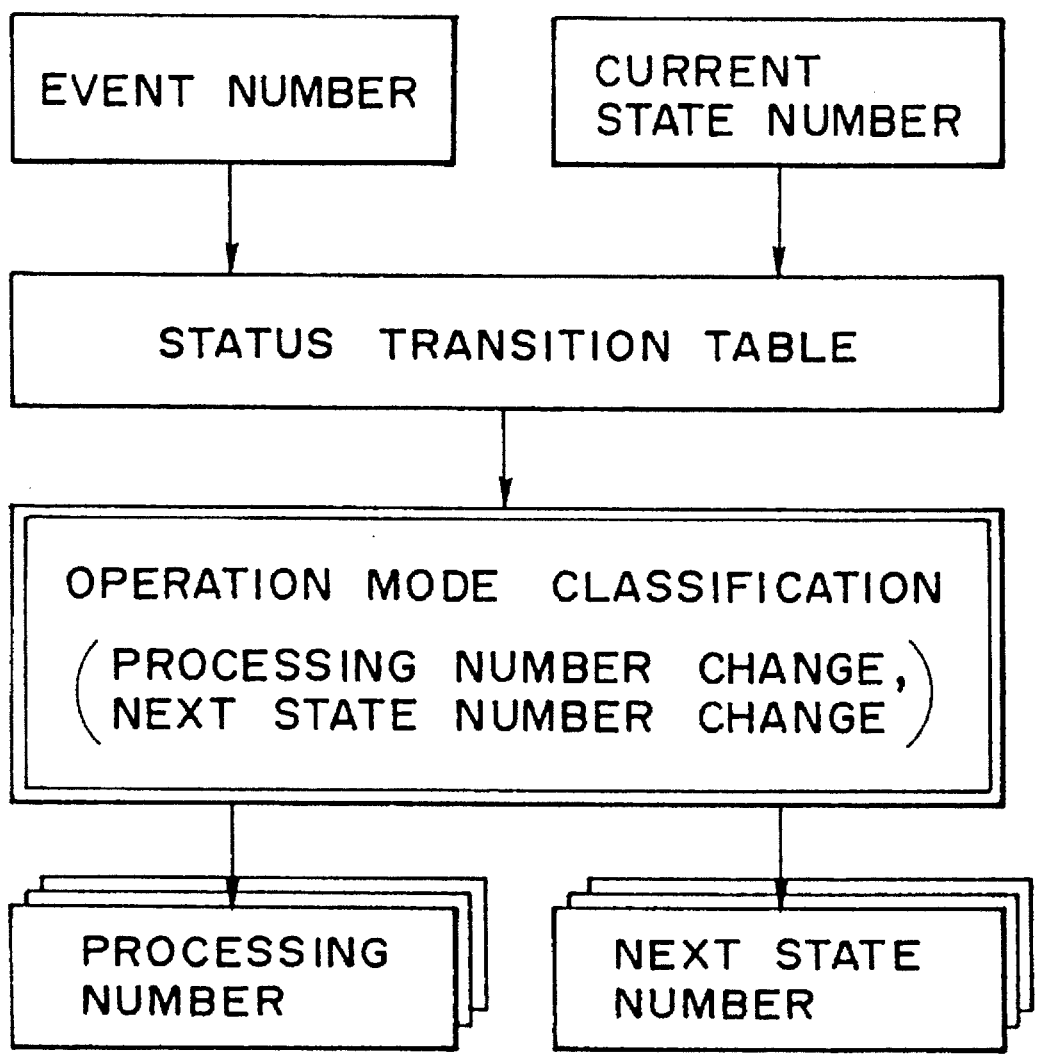
FIG. 1 is a flowchart for explaining the principles of the first embodiment of the invention.
Figure 4:
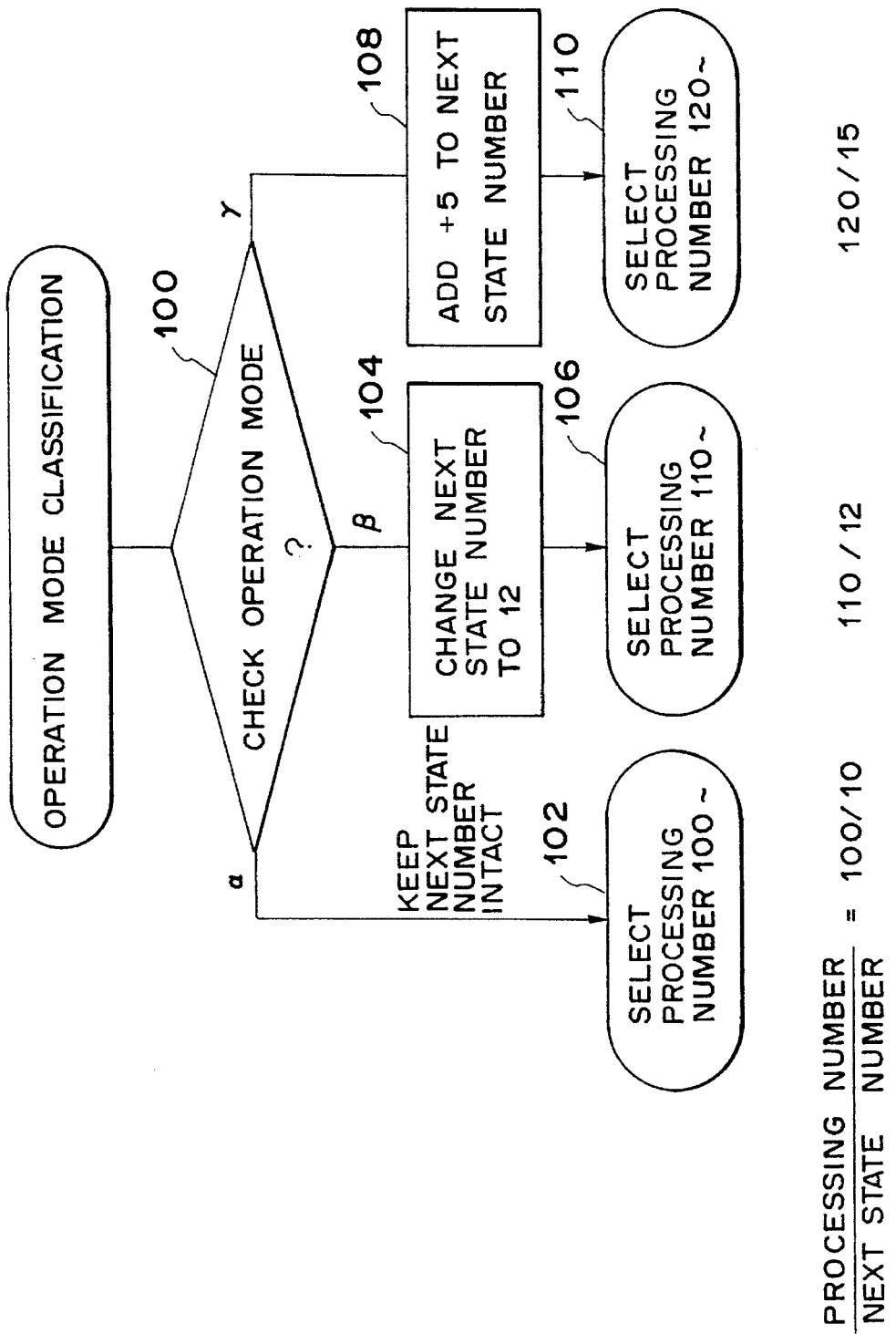
FIG. 4 is a flowchart for explaining the operation of the first embodiment of the invention.

In the first embodiment of the invention executing protocol selection using software, as shown in FIGS. 1 and 4, when an event number 20 is fetched from input communication information and 10 is set as a current state number in an input resister 20, a status transition table is retrieved according to these numbers. Based on the current state number 10 and event number 20, a processing number 200 representing a temporary protocol and a next state number 10 are extracted. When the processing number 200 is extracted, an operation mode placed in memory 34 is checked at a step 100. In the first embodiment of the invention, it is determined whether the operation mode is ∝, β, or γ. Then, if the operation mode is determined to be ∝, 100 is specified as a processing number representing a true protocol, and 10, as a next state number at a step 102. When the operation mode is determined to be β, the next state number is changed to 12 at a step 104. Then, the processing number associated with the true protocol is changed to 110 at a step 106. When the operation mode is determined to be γ, the next state number is changed to 15 at a step 108. Then, a processing number 120 is selected at a step 110.

When a processing number 100 is selected as a true protocol, information processing associated with the processing number 100 is executed. When a processing number 110 or 120 is selected, information processing associated with the processing number is executed. When the processing number 100 is selected, 10 is set as the next state number in the input resister 20. When the processing number 110 is selected, 12 is set as the next state number. When the processing number 120 is selected, 15 is set as the next state number.

Thus, according to the first embodiment of the invention, when a processing number 200 is selected according to a current state number 10 and an event number 20, three kinds of processing numbers are selected in association with operation modes. Therefore, a single communication control system 10 can execute information processing based on multiple protocols in association with operation modes.

In the foregoing embodiment, other memory areas except a memory area containing a processing number 200 that is specified with a current state number 10 and an event number 20 have processing numbers associated with true protocols. When any of these processing numbers is selected, processing is executed according to the selected processing number irrelative to an operation mode.

Figure 5:
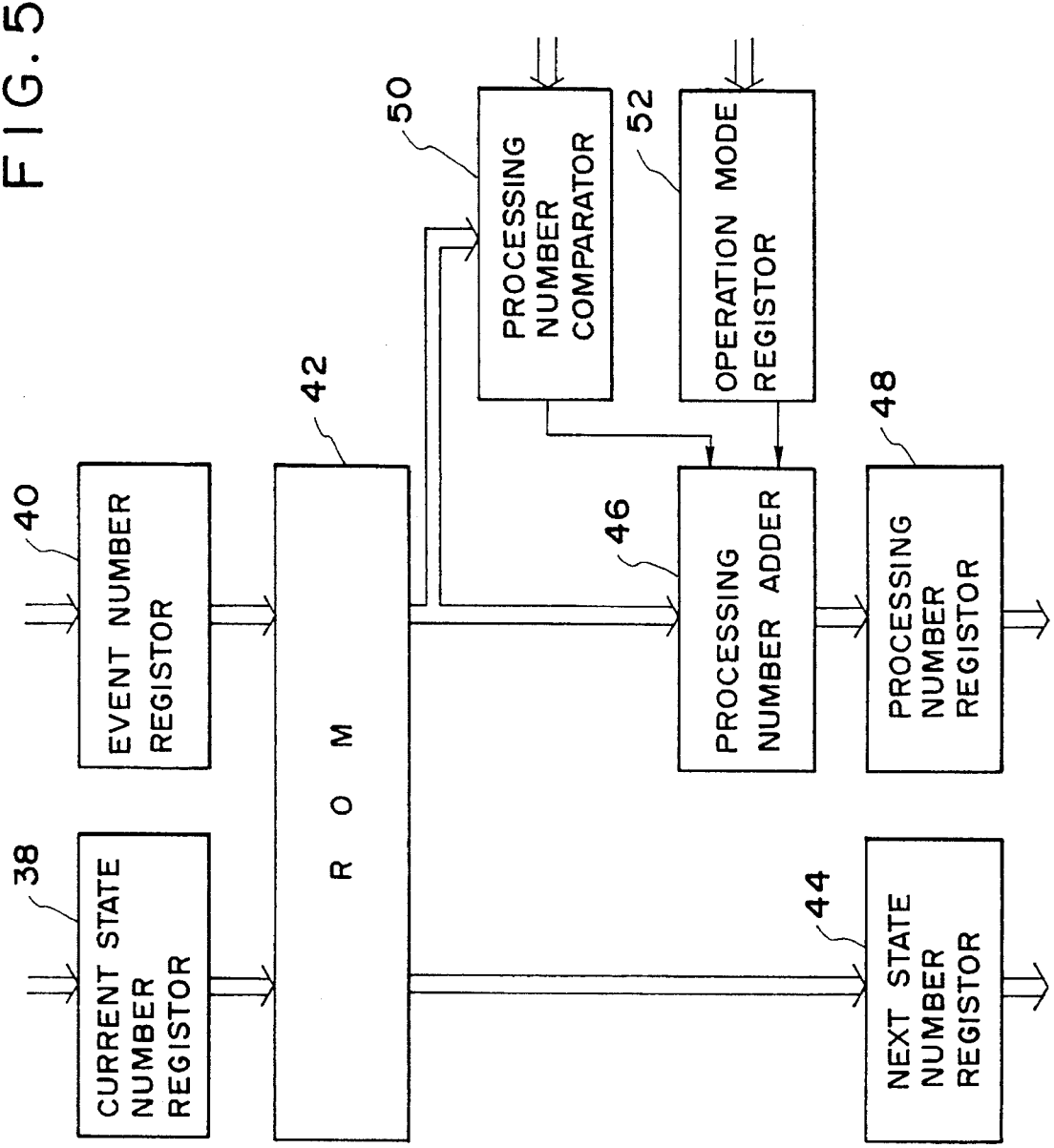
FIG. 5 is a configuration diagram of a main section of hardware for executing the first embodiment of the invention.
Figure 7:
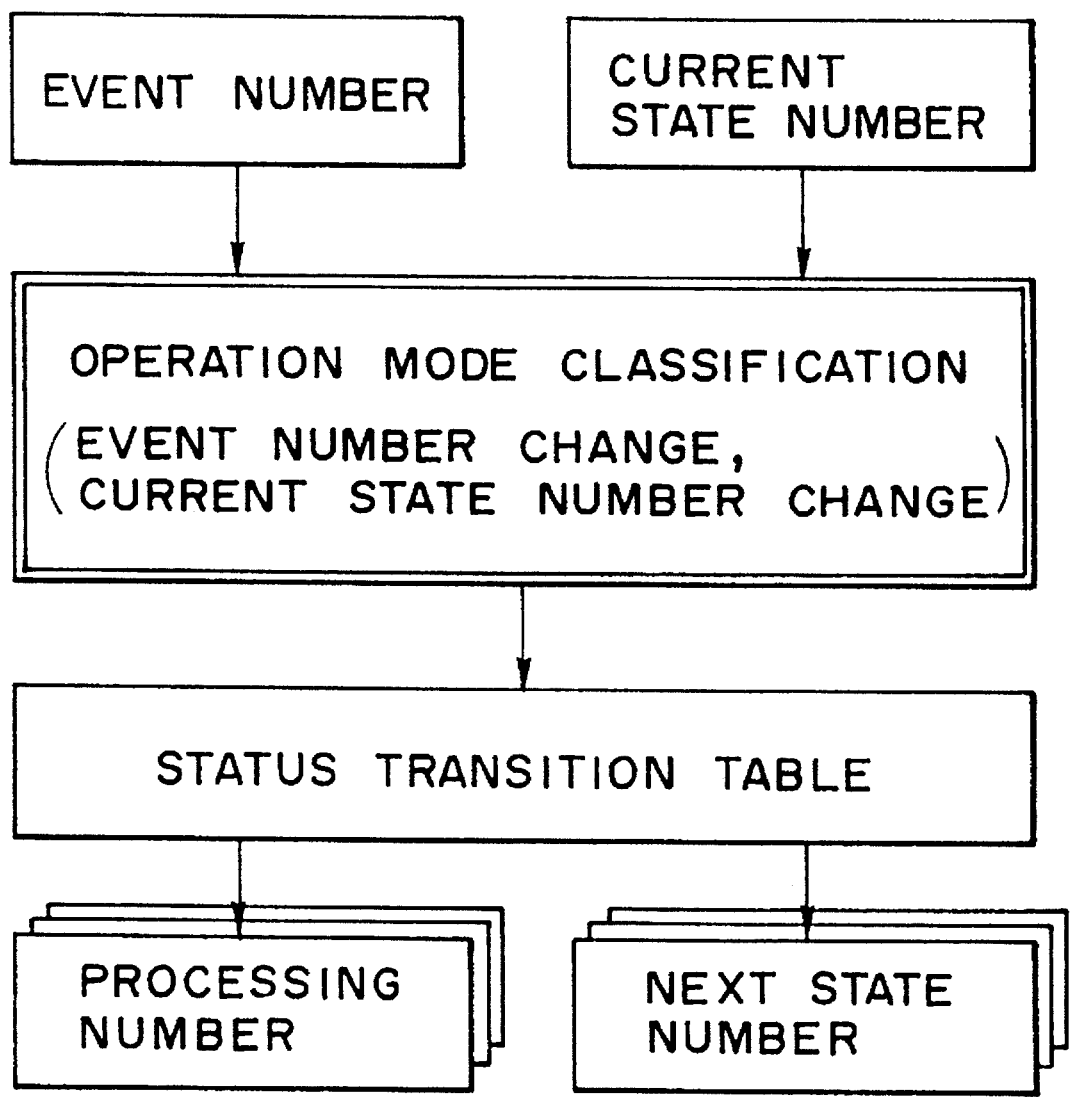
FIG. 7 is a flowchart for explaining the principles of the second embodiment of the invention.
Figure 8:
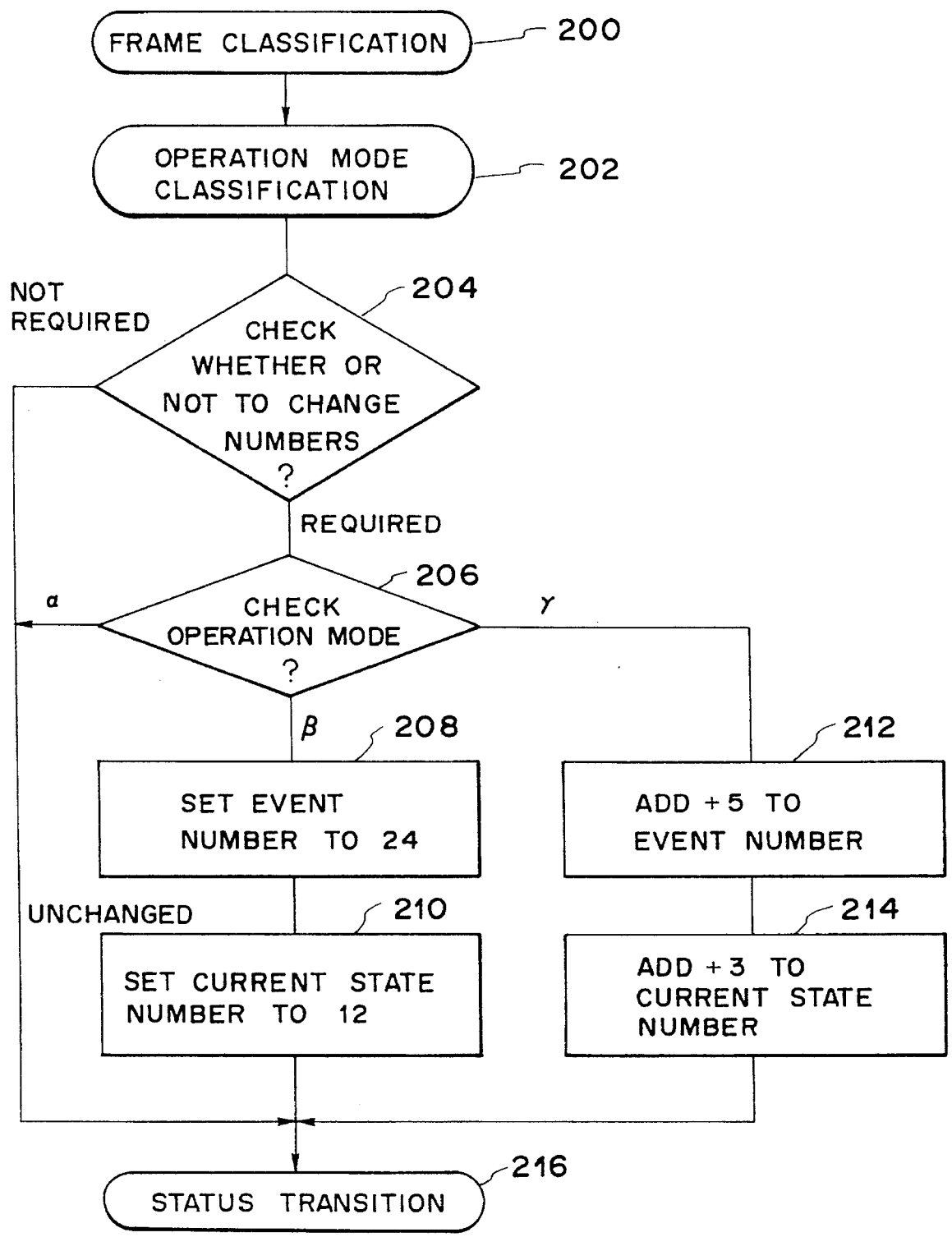
FIG. 8 is a flowchart for explaining the operation of the second embodiment of the invention.

When hardware is employed to carry out the processing of the aforesaid embodiment, a configuration shown in FIGS. 5 and 6 is adopted.

A current state number register 38 and an event number register 40 correspond to an input register 20. A ROM 42 serves as a memory corresponding to a status transition table circuit 22. A next state number register 44 and a processing number register 48 correspond to an output register 24. A processing number adder 46, a processing number comparator 50, and an operation mode register 52 are installed to set processing numbers in the processing number register 48. The memory areas of the ROM 42 contain data of processing numbers in association with table addresses. The table addresses 0 to 207 contain processing numbers 0 to 207 in association with true protocols. The table addresses 208 to 255 contain processing numbers in association with temporary protocols. Of these table addresses, the table addresses 208 to 223 contain data of ∝-mode processing numbers. The table addresses 224 to 239 contain data of β-mode processing numbers. The table addresses 240 to 255 contain data of γ-mode processing numbers.

In the foregoing configuration, when a designated current state number and event number are set in the current state number register 38 and event number register 40, a processing number associated with the current state number and event number is fetched from the ROM 42. When the processing number is 207 or less, the processing number is set in the processing register 48 as it is. On the other hand, when the processing number comparator 50 determines that the processing number exceeds 208, a value associated with an operation mode is set in the processing number adder 46. For example, when the operation mode set in the operation mode register 52 is an ∝ mode, 0 is added in. When the operation mode is a β mode, +16 is added in. When the operation mode is a γ mode. +32 is added in. To be more specific, when processing common among the operation modes is executed, a processing number ranging from 0 to 207 is selected. When processing different among the operation modes is executed, a processing number is selected according to an operation mode. Thereby, similarly to the aforesaid embodiment, a single communication control system 10 can execute information processing based on multiple protocols in association with operation modes. When a single LSI is used to form the communication control system 10, the system can be designed compactly at minimum manufacturing cost. Alternatively, hardware may be used. In this case, a variety of operations can be done simultaneously to realize high-speed processing.

Next, the second embodiment of the invention will be described in conjunction with FIGS. 1 to 9. In this embodiment, when a current state number ranges from 10 to 12 and an event number ranges from 20 to 24, a combination of an event number and a current state number remains unchanged in ∝ mode. The combination is changed to 24 and 12 in β mode, while the combination is changed to 25 to 29 and 13 to 15 in γ mode.

Figure 9:
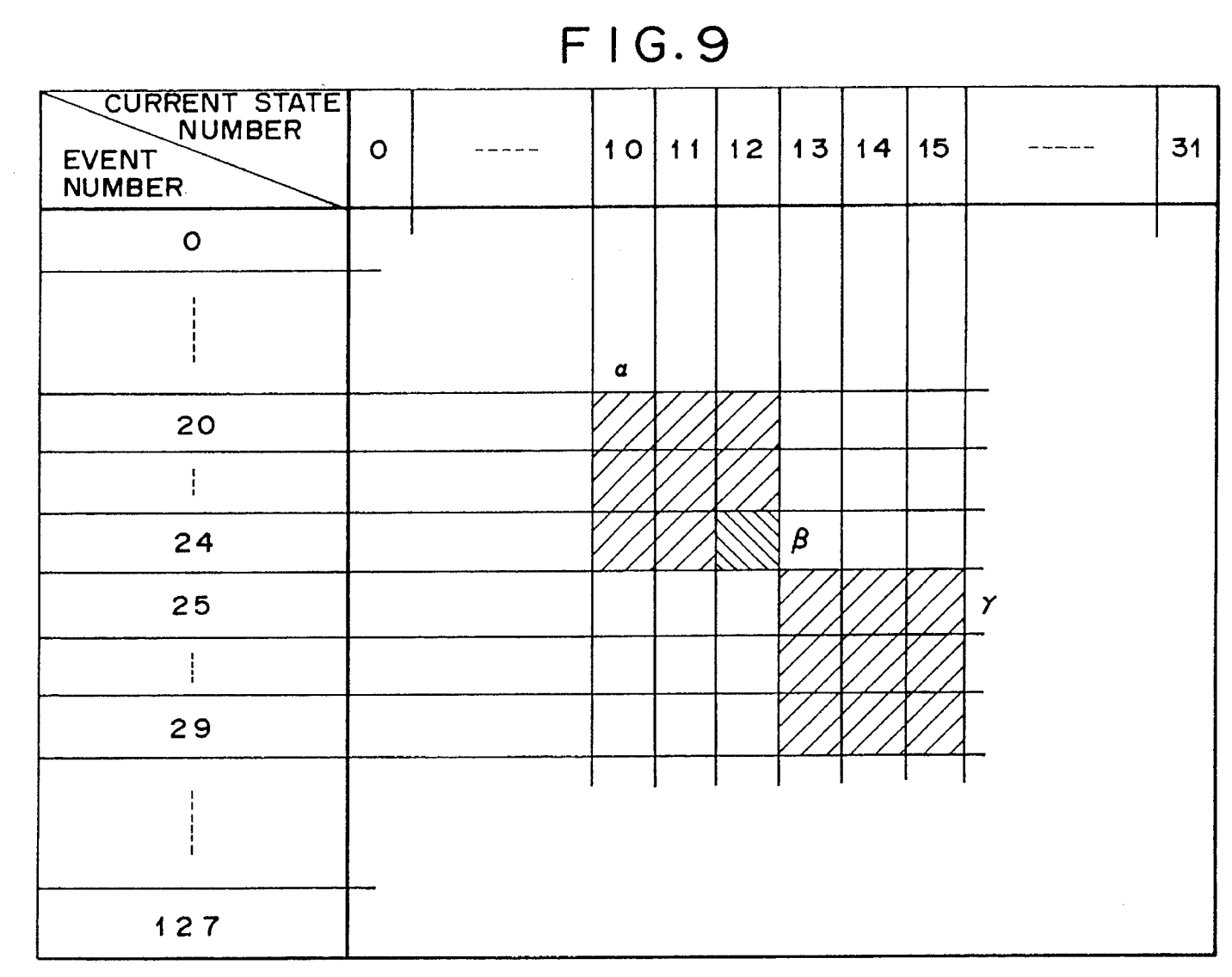

A status transition table circuit 22 in the second embodiment of the invention is configured to have memory areas shown in FIG. 9. When frame classification is carried out on receipt of input communication information, an event number is created according to the frame at a step 200. Then, operation mode classification is performed at a step 202. During the operation mode classification, it is determined whether or not to change the event number and a current state number at a step 204. That is to say, it is determined whether any value of 10 to 12 is set as a current state number and any value of 20 to 24 is set as an event number. If the result of the determination is negative, the status transition table is retrieved as it is. If the result of the determination is affirmative, the operation mode is checked at a step 206. When the operation mode is determined to be ∝, the current state number ranging from 10 to 12 and the event number ranging from 20 to 24 remains unchanged, then table retrieval is executed to retrieve a processing number and a next state number From an area specified with the current state number and event number at a step 216.

On the other hand, if the operation mode is determined to be β, the event number is changed to 24 forcibly at a step 208. The current state number is changed to 12 forcibly at a step 210. Then, at a step 216, a processing number and a next state number are extracted From a memory area associated with the current state number 12 and event number 24. Then, information processing is executed according to the processing number. If the operation mode is determined to be γ, +5 is added to the event number to create an auxiliary event number at a step 212. Then, +3 is added to the current state number to create an auxiliary current state number at a step 210. That is to say, when an event number ranging from 20 to 24 and a current state number ranging from 10 to 12 are designated, the event number is changed to range 25 to 29 and the current state number is changed to range 13 to 15. Then, a processing number and a next state number are retrieved from a memory area associated with the auxiliary event number and auxiliary current state number. Then, information processing is executed according to the retrieved processing number. Thus, the second embodiment of the invention also enables execution of status transition according to an operation mode.

Figure 10:
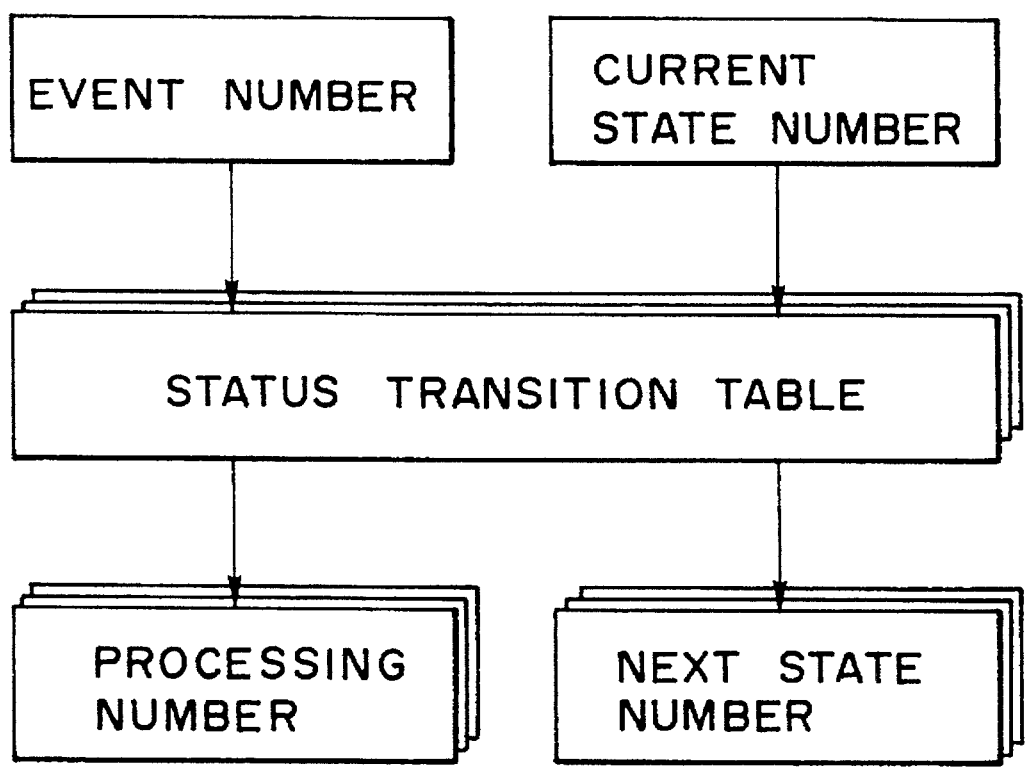
FIG. 10 is a flowchart for explaining the principles of the third embodiment of the invention.
Figure 11:
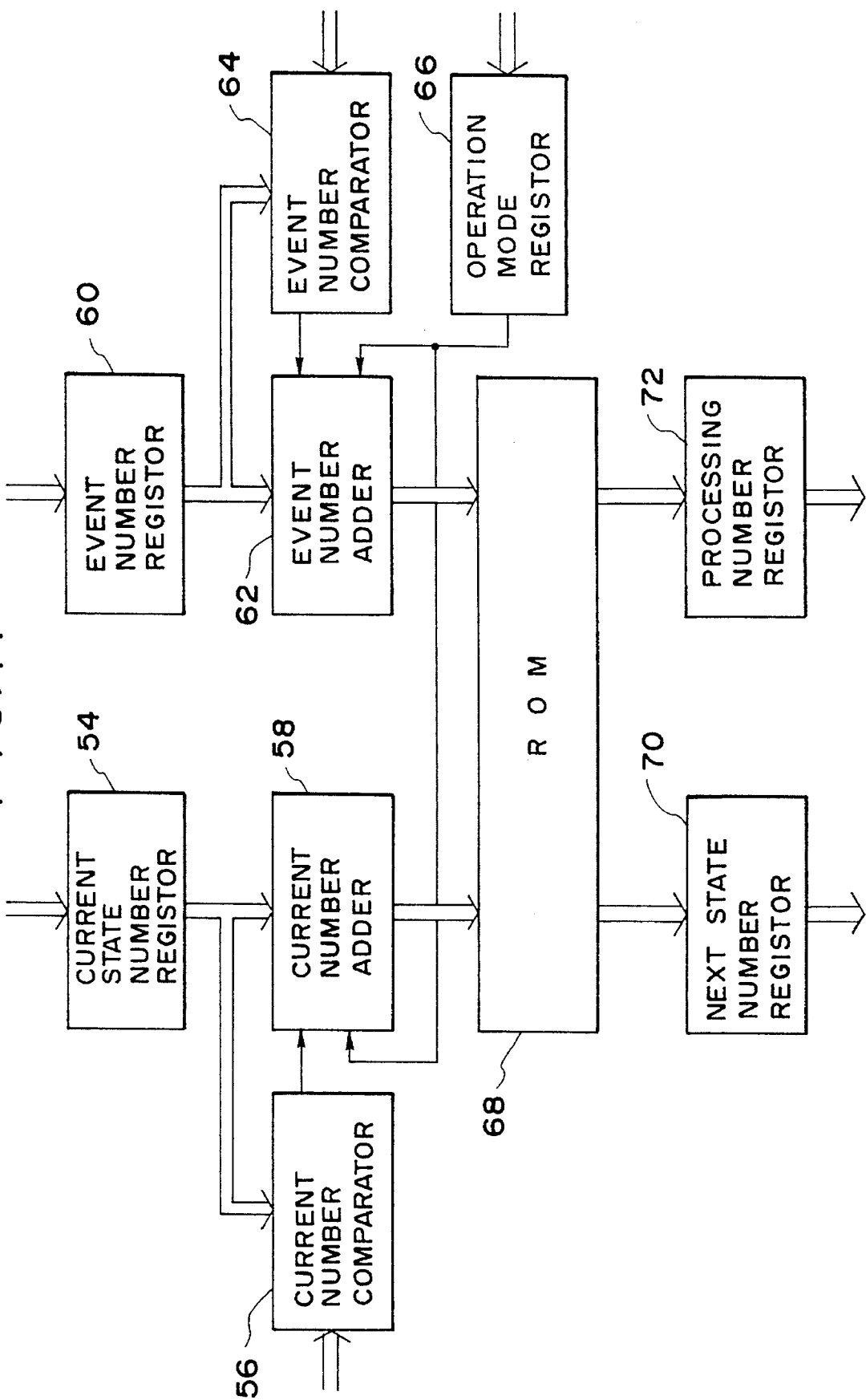
FIG. 11 is a configuration diagram of a main section showing an embodiment of the third embodiment of the invention.
Figure 12:
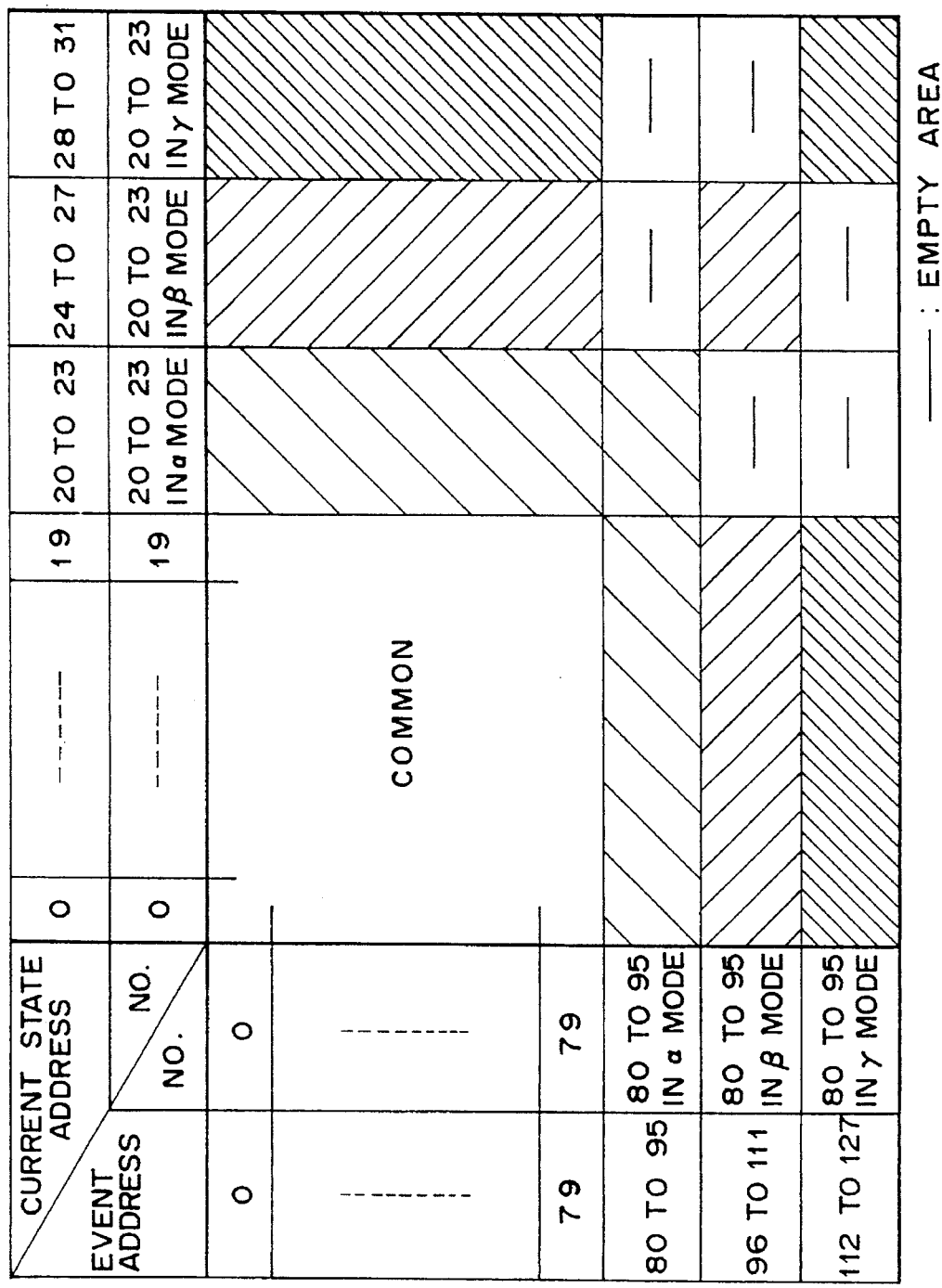
FIG. 12 is an explanatory diagram of a configuration of a status transition table.

Next, the third embodiment of the invention will be described in conjunction with FIGS. 10 to 12.

In the third embodiment of the invention or a variant of the embodiment of the invention, hardware is used to execute various operations. Various registers and processing circuits include a current state number register 54, a current state number comparator 56, a current state number adder 58, an event number register 60, an event number adder 62, an event number comparator 64, an operation mode register 66, a ROM 68, a next state number register 70, and a processing number register 72. The ROM 68 contain, as shown in FIG. 12, information of protocols associated with event numbers and current state numbers and information of protocols associated with auxiliary event numbers and auxiliary current stent numbers.

In the foregoing configuration, when a number ranging from 0 to 19 is set in the current state number register 54 and a number ranging from 0 to 79 is set in the event number register, these numbers pass through the current state number adder 58 and event number adder 62 respectively. Then, table retrieval is performed according to the event number and current state number. Specifically, a state processing number common among modes is extracted. Then, information processing is performed according to the extracted processing number.

On the other hand, when the current state number comparator 56 determines that the specified current state number exceeds 79, and the event number comparator 64 determines that the specified event number exceeds 79, values associated with an operation mode the operation mode register 66 specifies are added to the current state number and event number. For example, when the operation mode is an ∝ mode, 0 is added to a current state number and an event number. That is to say, in the ∝ mode, any event number ranging from 80 to 95 and any current state number ranging from 20 to 23 are set as they are. On the other hand, when the operation mode is a β mode, +16 is added to an event number and +4 is added to a current state number. Thus, an auxiliary event number and an auxiliary current state number are created. In the β mode, an event number ranging from 80 to 95 is converted to an auxiliary event number ranging from 96 to 111. A current state number ranging from 20 to 23 is converted to an auxiliary current state number ranging from 24 to 27. When the operation mode is γ, +32 is added to an event number, and +8, to a current state number. An event number ranging from 80 to 95 is converted to an auxiliary event number ranging from 112 to 127, and a current state number ranging from 20 to 23, to an auxiliary current State number ranging from 28 to 31. When the β mode or γ mode is specified, data of a processing number and a next state number is extracted from a memory area associated with the auxiliary event number and auxiliary current state number. The data values are set in the processing number register 72 and in the next state number register 70.

As mentioned above, according to the present embodiment, when an event number and a current state number fall within setting ranges, a specific processing number and next state number are retrieved from a status transition table according to an operation mode. Thus, communication can be executed in association with multiple operation modes.

Figure 13:
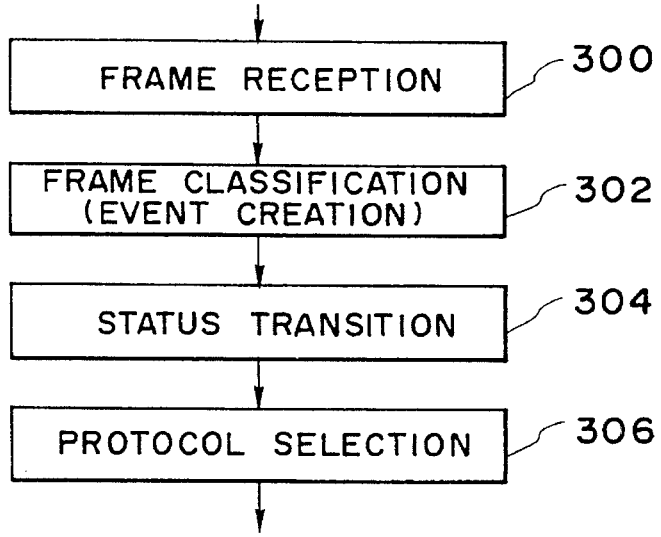
FIG. 13 is a flowchart for explaining the operation of the fourth embodiment of the invention.
Figure 14:
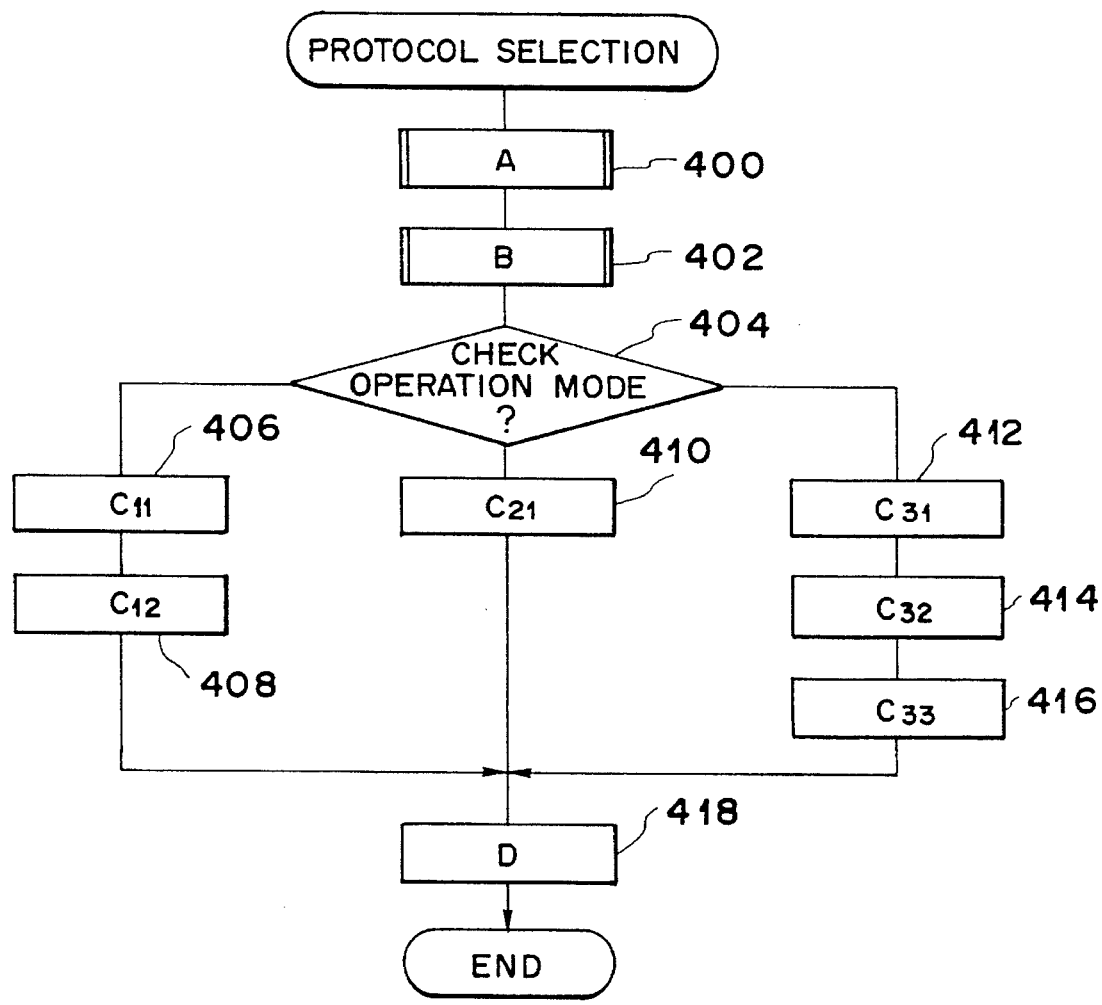
FIG. 14 is a flowchart for explaining protocol selection.

Next, the fourth embodiment of the invention will be described in conjunction with FIGS. 13 and 14.

The fourth embodiment of the invention is implemented in software. After communication information is received to fetch frames at a step 300, frame classification is performed to create event numbers for the frames at a step 302. Then, a status transition table is retrieved according to an event number and a current state number at a step 304. This retrieval specifies protocol selection at a step 306. Then, processing shown in FIG. 14 is executed. First, operations A and B of a subroutine are executed at steps 400 and 402. Then, an operation mode is checked at a step 404. When the checking determines that the operation mode is an ∞ mode, ∞-mode processing modules or programs C11 and C12 are executed at steps 406 and 408. When the operation mode is a mode, a processing module or a program C21 is executed at a step 410. On the other hand, when the operation mode is β, processing modules or programs C31, C32, and C33 are executed at steps 412, 414, and 416. After that, a processing module or a program D is executed at step 418. Thus, protocol selection is formed with multiple processing modules. When a combination of processing modules differs among operation modes, an operation mode is determined first, then processing modules associated with the operation mode are executed. In other words, an operation mode is classified not to specify a processing number but to specify processing modules for protocol selection. Then, processing is executed according to the classified operation mode. Thereby, processing modules can be executed in association with multiple operation modes.

The aforesaid embodiments have been described in relation to a communication control system. The embodiments can also apply to an information processing system in which information processing procedures are associated with event types and information processing states and information processing is executed according to any of the information processing procedures.

As described above, according to the present invention, various kinds of information processing can be executed in association with multiple operation modes. Multiple kinds of information processing can be executed under a single communication control system or information processing system. Therefore, a system can be designed compactly at low manufacturing cost.

What is claimed is:

1. A communication control system, comprising:

an event number setting means for setting an event number fetched from input communication information;

a processing state number setting means for setting a designated processing state number every time an event number is set;

a sub-protocol storage means for storing information of temporary protocols associated with event numbers and processing state numbers;

an operation mode setting means for setting multiple operation modes in association with temporary protocols;

a sub-protocol selecting means for retrieving information of a designated protocol from the sub-protocol storage means according to an event number the event number setting means sets and a processing state number the processing state number setting means sets;

an operation mode selecting means for selecting a designated operation mode according to temporary protocol information the sub-protocol selecting means provides;

a main protocol storage means for storing information of true protocols associated with operation modes;

a main protocol selecting means for retrieving information of a true protocol from the main protocol storage means according to an operation mode the operation mode selecting means provides;

an information processing means for executing information processing according to a true protocol the main protocol selecting means provides; and a processing state number designating means for designating a next processing state number for the processing state number setting means with running by the information processing means.

2. A communication control system, comprising:

an event number setting means for setting an event number fetched from input communication information;

a processing state number setting means for setting a designated processing number every time an event number is set;

an operation mode storage means for storing a plurality of operation modes in association with event numbers and processing state numbers;

an operation mode selecting means for retrieving a designated operation mode from the operation mode storage means according to an event number the event number setting means sets and a processing state number the processing state number setting means sets;

an auxiliary event number creating means for creating an auxiliary event number associated with an operation mode according to an event number the event number setting means sets;

an auxiliary processing state number creating means for creating an auxiliary processing state number associated with an operation mode according to a processing state number the processing state number setting means sets;

a protocol storage means for storing information of true protocols associated with auxiliary event numbers and auxiliary processing state numbers;

a protocol selecting means for retrieving information of a true protocol from the main protocol storage means according to a created auxiliary event number and auxiliary processing state number;

an information processing means for executing information processing according to a true protocol the protocol selecting means provides: and a processing state number designating means for designating a next processing state number for the processing state number setting means with running of the information processing means.

3. A communication control system, comprising:

an event number setting means for setting an event number fetched from input communication information;

a processing state number setting means for setting a designated processing number every time an event number is set:

an operation mode setting means for setting a designated operation mode every time an event number is set;

an event number checking means for determining whether an event number the event number setting means sets falls within a setting range;

an auxiliary event number creating means for creating an auxiliary event number associated with an operation mode the operation mode setting means sets according to an event number when the event number checking means determines that the event number the event number setting means sets falls within a setting range;

a processing state number checking means for determining whether a processing state number the processing state number setting means sets falls within a setting range;

an auxiliary processing number creating means for creating an auxiliary processing state number associated with an operation mode the operation mode setting means sets according to a processing state number when the processing state number checking means determines that the processing state number the processing state number setting means sets falls within a setting range;

a protocol storage means for storing information of a plurality of protocols associated with auxiliary event numbers and auxiliary processing state numbers;

a protocol selecting means for retrieving information of a designated protocol from the protocol storage means according to an auxiliary event number the auxiliary event number creating means creates and an auxiliary processing state number the auxiliary processing state number creating means creates;

an information processing means for executing information processing according to a protocol the protocol selecting means provides; and a processing state number designating means for designating a next processing state number for the processing state number setting means with running of the information processing means.

4. A communication control system, comprising:

an event number setting means for setting an event number fetched from input communication information;

a processing state number setting means for setting a designated processing number every time an event number is set;

a protocol storage means for storing information of a plurality of protocols associated with event numbers and processing state numbers;

a protocol selecting means for retrieving information of a designated protocol from the protocol storage means according to an event number the event number setting means sets and a processing state number the processing state number setting means sets;

an operation mode storage means for storing operation modes in association with protocols;

an operation mode selecting means for retrieving a designated operation mode from the operation mode storage means according to a protocol the protocol selecting means provides:

a processing module storage means for storing processing modules in association with operation modes;

a processing module selecting means for retrieving a designated processing module from the processing module storage means according to an operation mode the operation mode selecting means provides;

a processing module executing means for executing a processing module the processing module selecting means provides: and a processing state number designating means for designating a next processing state number for the processing state number setting means with execution of a processing module.

5. An information processing system, comprising:

an event type setting means for setting an event type fetched from input information;

an information processing state setting means for setting a designated information processing state every time an event type is set;

a sub-processing procedure storage means for storing information of temporary information processing procedures associated with event types and information processing states;

an operation mode setting means for setting a plurality of operation modes in association with temporary information processing procedures;

a sub-processing procedure selecting means for retrieving information of a designated information processing procedure from the sub-processing procedure storage means according to an event type the event type setting means sets and an information processing state the information processing state setting means sets;

an operation mode selecting means for selecting a designated operation mode according to a temporary information processing procedure the sub-processing procedure selecting means provides;

a main processing procedure storage means for storing information of true information processing procedures associated with operation modes:

a main processing procedure selecting means for retrieving information of a true processing procedure from the main processing procedure storage means according to an operation mode the operation mode selecting means provides;

an information processing means for executing information processing according to a true information processing procedure the main processing procedure selecting means provides; and a processing state number designating means for designating a next information processing state for the information processing state setting means with running of the information processing means.

6. An information processing system, comprising:

an event type setting means for setting an event type fetched from input information:

an information processing state setting means for setting a designated information processing state every time an event type is set;

an operation mode storage means for storing a plurality of operation modes associated with event types and information processing states;

,an operation mode selecting means for retrieving a designated operation mode from the operation mode storage means according to an event type the event type setting means sets and an information processing state the information processing state setting means sets;

an auxiliary event type creating means for creating an auxiliary event type associated with an operation mode according to an event type the event type setting means sets;

an auxiliary information processing state creating means for creating an auxiliary information processing state associated with an operation mode according to an information processing state the information processing state setting means sets;

a processing procedure storage means for storing information of true processing procedures associated with auxiliary event types and auxiliary information processing states;

a processing procedure selecting means for retrieving information of a true information processing procedure from the information processing procedure storage means according to a created auxiliary event type and auxiliary information processing state;

an information processing means for executing information processing according to a true information processing procedure the processing procedure selecting means provides; and an information processing state designating means for designating a next information processing state for the information processing state setting means with running of the information processing means.

7. An information processing system, comprising:

an event type setting means for setting an event type fetched from input information;

an information processing state setting means for setting a designated information processing state every time an event type is set;

an operation mode setting means for setting a designated operation mode every type an event type is set;

an event type checking means for determining whether an event type the event type setting means sets falls within a setting range;

an auxiliary event type creating means for creating an auxiliary event type associated with an operation mode the operation mode setting means sets according to an event type when the event type checking means determines that the event type the event type setting means sets falls within a setting range;

an information processing state checking means for determining whether an information processing state the information processing state setting means sets falls within a setting range;

an auxiliary information processing state creating means for creating an auxiliary information processing state associated with an operation mode the operation mode setting means sets according to an information processing state when the information processing state checking means determines that the information processing state the information processing state setting means sets falls within a setting range;

a processing procedure storage means for storing information of a plurality of information processing procedures associated with auxiliary event types and auxiliary information processing states;

a processing procedure selecting means for retrieving information of a designated information processing procedure from the processing procedure storage means according to an auxiliary event type the auxiliary event type creating means creates and an auxiliary information processing state the auxiliary information processing state creating means creates;

an information processing means for executing information processing according to an information processing procedure the information processing procedure selecting means provides; and an information processing state designating means for designating a next information processing state for he information processing state setting means with running of the information processing means.

8. An information processing system, comprising:

an event type setting means for setting an event type fetched from input information;

an information processing state setting means for setting a designated information processing state every time an event type is set;

a processing procedure storage means for storing information of a plurality of information processing procedures associated with event types and information processing states;

a processing procedure selecting means for retrieving information of a designated information processing procedure from the processing procedure storage means according to an event type the event type setting means sets and an information processing state the information processing state setting means sets;

an operation mode storage means for storing operation modes in association with information processing procedures;

an operation mode selecting means for retrieving a designated operation mode from the operation mode storage means according to an information processing procedure the processing procedure selecting means provides;

a processing module storage means for storing processing modules in association with operation modes;

a processing module selecting means for retrieving a designated processing module from the processing module storage means according to an operation mode the operation mode selecting means provides:

a processing module executing means for executing a processing module the processing module selecting means provides; and an information processing state designating means for designating a next information processing state for the information processing state setting means with execution of a processing module.

9. A microcomputer having a system according to any one of claims 1 to 8 as a main component.

* * * * *